UNITED STATES PATENT OFFICE 2,190,841

DIAZOAMINO ETHER AND METHOD OF MAKING

Jean G. Kern, East Aurora, N. Y., assignor to National Aniline and Chemical Company, Inc., New York, N. Y., a corporation of New York No Drawing. Application May 14, 1938, Serial No. 207,943

8 Claims. (Cl. 260—140)

This invention relates to a new type of diazoamino compounds and to compositions of matter containing them. The diazoamino compounds of the present invention are especially suitable for use in the art of dyeing textile fibers of any origin, for instance in the dyeing or printing of cellulose, either natural fibers or regenerated cellulose, cellulose esters or ethers, silk, wool, or hair fibers or fabrics. The diazoamino compounds of the present invention are useful as germicides, bactericides, and insecticides.

The diazoamino compounds of the present invention comprise on the one side of the diazoamino group an aromatic group joined directly to the diazo group, which aromatic group has the property of forming with an azo coupling component an insoluble azo compound, and on the other side of the diazoamino group a solubilizing group separated from the diazoamino group by an ether group.

Thus the compounds of the invention may be represented by the general formula:

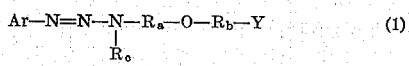    (1)

wherein Ar represents an aromatic radical capable of forming insoluble azo compounds, and free from groups (not separated from the aromatic nucleus by an —N=N—N— linkage) of the type $$-ZO_xM_x$$

wherein Z represents the radical obtained by subtracting the hydroxyl groups from an oxygen acid group, M represents hydrogen or a metal, $x$ represents a positive integer designating the number of hydroxy or metaloxy groups joined to the radical Z, for instance 1 or 2, and $v$ represents the valence of M; that is, Ar is free of acid and acid salt groups, such as —COOH, —SO₂OH, —O—SO₂OH, —OPO(OH)₂, —AsO(OH)₂, and the corresponding groups wherein one or more H is substituted by Na, K, etc.

$R_a$ represents an organic radical joined by a carbon thereof (the same or a different carbon) to —N— and to —O—;

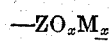

$R_b$ represents an organic radical joined by a carbon thereof (the same or a different carbon) to —O— and to —Y;

$R_c$ represents hydrogen or an organic radical joined by a carbon thereof to —N—;

O represents an ether oxygen; and

Y represents a solubilizing group conferring solubility in water or aqueous alkaline solution.

In the above formula it should be noted that one, two, or more amino-diazo-groups,

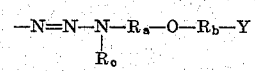

may be joined to Ar; that is, the compounds may include not only diazo nuclei but tetrazo (bis-diazo) nuclei, etc. Ar may represent a group such as phenyl, naphthyl, diphenyl, diphenylsulfone, diphenyloxide, anthranyl, anthraquinonyl, or carbazol, which may contain as substituents halogens (e. g., chlorine, bromine, or fluorine), and nitro, alkyl, aryl, aralkyl, alkylaryl, alkoxy, aryloxy, azo, amino (primary, secondary, or tertiary) groups and sulfonamido, sulfonamidoalkyl, or hydroxy groups (provided such groups do not render the azo products soluble), as well as additional aminodiazo groups as indicated above.

$R_a$ and $R_b$ may comprise aliphatic, alicyclic, or aromatic radicals wherein the carbons linked to —N—, —O— and —Y may be separated from one another by —O—, —CONH—, —COO—, —CO—, —S—, —SO—, —SO₂—, or —SO₂—NH— in any fashion. $R_a$ and $R_b$ may be saturated or unsaturated and may contain substituents which do not interrupt the aminic —N— to —O— to —Y linkage, especially electro-negative substituents, e. g., halogen, or nitro, nitrile, or sulfonic acid ester groups; or —CONH—, —CON=, —SO₂NH—, or —SO₂N= groups attached thereon in any fashion; or radicals conferring solubility in water or alkaline solution, e. g. sulfite, sulfato, phosphato, sulfonate, carboxylate, or phenolic or alcoholic hydroxyl groups; or additional radicals of the types

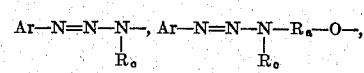

and —O—$R_b$—Y. $R_a$ can also be linked to $R_b$ whereby an inner ether radical is produced. It should be noted that neither of the carbon atoms joined to —O— can be a carbonyl group since in that event the product would be an ester instead of an ether. Certain of the compounds of the ester type are included within the scope of my parent application Serial No. 740,179, filed August 16, 1934, of which the present application is in part a continuation.

Y may be any of the groups conventionally considered solubilizing groups and which, as is well known, contribute to the solubility, in water or aqueous alkaline solutions, of compounds to which they are attached. Such groups are alcoholic or phenolic —OH groups, —COOH, —SO$_3$H, —OPO$_3$H$_2$, —OSO$_2$H, —OSO$_3$H, and the corresponding groups wherein the H is replaced by sodium or potassium or a pentavalent nitrogen radical.

R$_c$ may be hydrogen or it may be a radical of the type —R$_a$—O—R$_b$—Y, or it may contain another group Ar—N=N—N—R$_a$—O—R$_b$—Y, or it may be a radical such as R$_a$ or R$_b$. R$_c$ may be linked to, or condensed with, R$_a$ or R$_b$ thus forming a heterocyclic ring in which the aminic nitrogen, or the aminic nitrogen and the ether oxygen, are constituent parts thereof.

In the preferred compounds R$_a$ is a hydrocarbon group which may be further substituted but which does not contain a chain of more than two aliphatic carbon atoms separating the aminic nitrogen from the ether group.

The resistance of the more stable diazoamino compounds to hydrolysis may be reduced by the introduction of electro-negative substituents attached to the carbon joined to the diazoamino nitrogen or attached to a carbon adjacent to this carbon. Electro-negative groups suitable for accomplishing this purpose have been set forth above in the definition of R$_a$ and R$_b$.

The diazoamino compounds of this invention, especially those that contain a plurality of hydroxyl groups and/or carboxylic acid radicals, COOMe, and/or sulfonic acid radicals, SO$_3$Me, wherein Me represents hydrogen, sodium or potassium, possess notable solubility in water or aqueous alkaline solutions and hence are especially valuable for use where rapid solution is desirable. This property constitutes a marked advantage of the compounds of the present invention whether they are employed as dyestuffs, or insecticides, bactericides, etc.

The diazoamino compounds of the present invention may be prepared by coupling an aromatic diazonium salt of the general formula

$$\text{Ar}-(\text{N}=\text{N}-z)_x \qquad (2)$$

(wherein Ar represents an aromatic radical as previously set forth; z represents an acid group, for example Cl; and $x$ represents a positive integer indicating the number of diazo substituents on the aromatic residue, preferably 1, 2, or 3) with the stoichiometrical quantity of a primary or secondary amino-ether of the general formula:

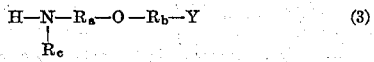
$$\text{H}-\text{N}-\text{R}_a-\text{O}-\text{R}_b-\text{Y} \qquad (3)$$
$$|$$
$$\text{R}_c$$

wherein R$_a$, R$_b$ and R$_c$ have the values previously ascribed. However they should not be such as will couple with the diazo group to form an azo compound.

The reaction to form the diazoamino compounds proceeds at low temperatures. The coupling of the diazonium salt with the aminoether is advantageously effected by bringing together aqueous solutions of the individual reactants in the presence of an alkaline medium which serves to bind the acid liberated by the coupling. The diazoamino compound may be recovered by crystallization, including salting out, or by drying the solution containing it in vacuum or in other suitable manner, for instance, with the aid of an inert gas or on a rotary drum drier.

The compounds of my invention are especially applicable to the dyeing of textile fibers and may be used for this purpose in a manner similar to diazo or nitrosamine compositions. The diazoamino compounds of this invention are stable in the presence of coupling components and hence may be used for the preparation of stable dye compositions comprising one or more of the diazoamino compounds and a suitable coupling component or components.

Coupling of the diazoamino compounds of this invention with coupling components which are normally employed with the diazo compounds corresponding to the said diazoamino compounds may be effected by treatment with acid, as by introducing an acid into the bath containing a solution of the diazoamino compound and the coupling component, or by subjecting fibers containing a coupling component to the action of an acidified bath of the diazoamino compound or by subjecting fibers impregnated with a solution or paste of the diazoamino compound and a coupling component to the action of an acid bath or acid vapors.

The proportions of coupling component to diazoamino compound in the compositions of my invention may vary widely. Preferably, however, I mix the two constituents in about stoichiometrical quantities. The compositions may comprise the constituents in dry form or in solution. The dry composition may be prepared by mechanical admixture of the two constituents in solid phase or by evaporating a solution of the two constituents.

The compositions containing a diazoamino compound of the present invention and a coupling component may be applied to textile fibers in the usual manner. They are particularly suitable for the dyeing of fabrics by the printing process.

A printing paste is prepared by mixing together about stoichiometrical quantities of a diazoamino compound of the type previously defined and a coupling component, adding to the mixture sodium hydroxide solution in quantity sufficient to dissolve the components, and making up the mixture to a printing paste in the usual manner by adding thereto a thickening agent such as starch or gum tragacanth and the necessary quantity of water. If desired, Turkeyred oil or other assistants or solvents may be added. The fabric is printed with this printing paste in the usual manner; then either with or without drying and steaming, it is treated for a short time, say around twenty seconds, in a bath containing an acid, for example ½ per cent to 5.0 per cent of formic acid, acetic acid, or oxalic acid at a temperature between 50° and 95° C. The bath may also contain other assistants, penetrants, etc. for example around 5 per cent of Glauber's salt (Na$_2$SO$_4$.10H$_2$O), or sodium chloride (NaCl), or sodium acetate (CH$_3$COONa). Instead of developing the dye in an acid bath, it may be developed by passing it through an acid-vapor ager containing, for example, steam and vapors of acetic or formic acid or both. After development of the print in any of the above manners, it may be rinsed, washed, and dried in the customary manner.

The following examples of amines which may be diazotized and coupled to form diazoamino compounds within the purview of the present invention, illustrate the applicability of the invention to the aromatic diazo compounds in general.

3-chloraniline
4-chlor-2-amino-1-methylbenzene
4-chlor-2-amino-1-methoxybenzene
4-nitro-2-amino-1-methylbenzene
5-nitro-2-amino-1-methylbenzene
3-nitro-4-amino-1-methylbenzene
5-chlor-2-amino-1-methylbenzene
3-chlor-2-amino-1-methylbenzene
6-chlor-2-amino-1-methylbenzene
3-chlor-4-amino-1-methylbenzene
4,5-dichlor-2-amino-1-methylbenzene
2,5-dichlor-4-amino-1-methylbenzene
6-benzoylamino-4-chlor-3-amino-1-methoxybenzene
2,5-dichlor-1-aminobenzene
1-aminoanthraquinone
1-amino-4-benzoylaminoanthraquinone
2-amino-diphenyl-sulfone
2-amino-4-methoxy-5-phenylamino-1-chlorobenzene
4,6-dichloro-2-amino-1-methylbenzene
2,4-dimethylaniline
3-amino-4-methoxy-6-nitro-1-methylbenzene
3-amino-4-methoxy-6-benzoylamino-1'-methylbenzene
3-benzoylamino-4,6-dimethoxyaniline
4,4'-diamino-3,3'-dimethoxy-azobenzene
2,6-dimethoxy-4-benzoylamino-aniline
2,5-dimethoxy-4-benzoylamino-aniline
2-methoxy-4-benzoylamino-5-ethoxy-aniline
4-nitro-4'-amino-2',5'-dimethoxy-azobenzene
3-nitro-4'-amino-2',5'-dimethoxy-azobenzene
4-methyl-4'-amino-2-methoxy-5-methyl-azobenzene
4-chloro-4'-amino-2',5'-diethoxy-azobenzene
3-amino-benzotrifluoride.

The following amino-ethers illustrate the variety of compounds which may be obtained therewith when coupled into diazo compounds in order to produce the diazoamino or diazoimino derivatives of the present invention.

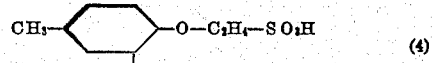

(4) 1-methyl-3-aminobenzene-4-oxy-ethyl-sulfonic acid

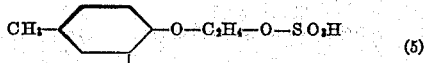

(5) 1-methyl-3-methylamino-benzene-4-oxy-ethyl-sulfuric aicd

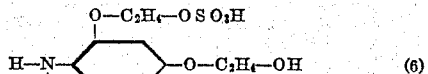

(6) 1-amino-4-hydroxyethoxy-benzene-2-oxy-ethyl-sulfuric acid

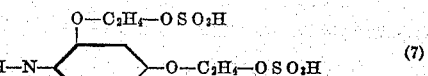

(7) 1-methylaminobenzene-2, 4-di-(oxy-ethyl-sulfuric acid)

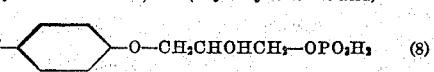

(8) 1-methylaminobenzene-4-glyceryl phosphoric acid

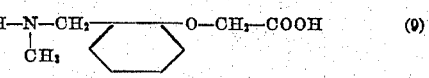

(9) 1-methylamino-methyl-benzene-2-oxy-acetic acid

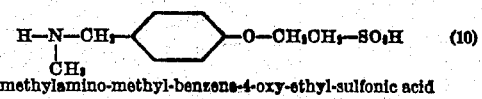

(10) 1-methylamino-methyl-benzene-4-oxy-ethyl-sulfonic acid

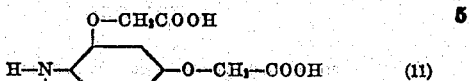

(11) 1-methylaminobenzene-2,4-di-(oxy-acetic acid)

(12) 1-methylaminobenzene-4-oxymethyl-benzene-2',5'-disulfonic acid

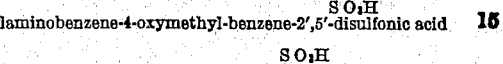

(13) 1-ethylaminobenzene-4-oxymethylbenzene-2', 5'-disulfonic acid

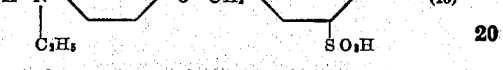

(14) 1-aminobenzene-4-oxy-ethyl-sulfonic acid

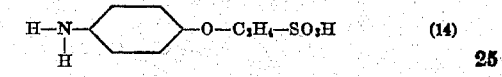

(15) 1-methylaminobenzene-2, 4-di-(oxy-ethyl-sulfonic acid)

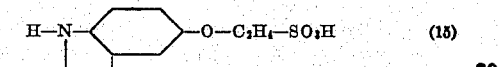

(16) 1-methylaminobenzene-4-oxy-pentahydroxy-hexane

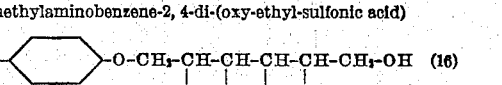

(17) 1-ethylaminomethyl-benzene-2, 4-di-(oxy-acetic acid)

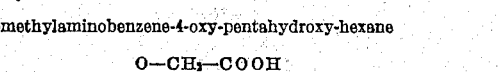

(18) 1-ethyl-aminomethyl-benzene-2, 4-di-(oxy-ethyl-sulfonic acid)

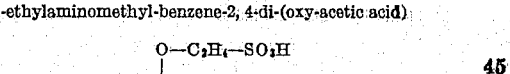

(19) 1-cyclohexylamino-benzene-2, 4-di(oxy-methylbenzene-2', 5'-disulfonic acid)

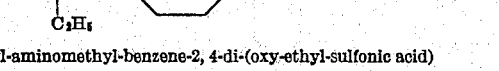

(20) Ethylaminobenzene-para-oxy-(2-hydroxy)propyl-sulfuric acid

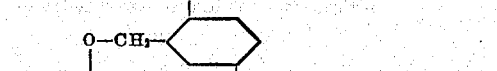

(21) 1-methylamino-3-chlor-benzene-6-oxy-acetic acid

(22) 1-methylamino-3-chlor-benzene-6-oxy-succinic acid

(23) 1-methylamino-naphthalene-2-oxy-ethyl-sulfonic acid

(24) 1-methylamino-naphthalene-2-oxy-acetic acid

(25) 1-methylamino-naphthalene-2-oxy-succinic acid

(26) 1-methylamino-naphthalene-4-oxy-acetic acid

(27) 9-methylamino-naphthalene-4-oxy-ethyl-sulfonic acid

(28) 1-ethylamino-naphthalene-4-oxy-succinic acid

(29) 1-ethylamino-3-chlorbenzene-6-oxy-malonic acid

(30) 1-methylamino-3-chlor-benzene-6-oxy-phenyl-monosulfonic acid

(31) 1-ethylamino-3-chlor-benzene-6-oxy-phenyl-disulfonic acid

(32) 1-methylaminobenzene-4-oxy-phenyl-4'-oxy-acetic-5'-sulfonic acid

(33) 1-methylaminomethyl-3-chlor-benzene-4-oxy-succinic acid

(34) 1-methylaminobenzene-4-beta-oxy-naphthalene-sulfonic acid

(35) Di-(methylamino-phenoxy)-succinic acid

(36) 1,4-di-(paramethylamino-benzyl-oxy)-benzene-disulfonic acid

(37) 3,3'-di(methylamino)-diphenylmethane-6,6'-di (oxy-acetic acid)

(38) 3,3'-di(ethylamino)-diphenyl-methane-6,6'-di(oxy-succinic acid)

(39) 3,3'-di(ethylamino)-6,6'-di(sulfophenoxy)-diphenylmethane

(40) 3,3'-di(ethylamino)-6,6'-di(2,5 disulfobenzyloxy)-diphenylmethane

(41) Para-methylamino-phenoxy-acetic acid

(42) 1-methyl-3-methylamino-benzene-4-oxyethyl-sulfuric acid

(43) 2-ethylamino-4-chlor-phenoxy-butyl-sulfuric acid

(44) 1-methylaminoethoxy-3-sulfonyl-6-benzoic acid

(45) 2-methylaminoethoxy phenoxysuccinic acid

(46) N-methyl-N-methylamino-ethyl-ortho-amino-phenoxysuccinic acid

(47) Methylaminoethoxy-ethyl-sulfonic acid

(48) 3-(3'-amino-2'-hydroxy-propyloxy)-2-hydroxy-propyl sulfate

(49) Ethylene-di(amino-p-phenoxysuccinic acid)

(50) Ethylene-di-(amino-p-phenoxy-acetyl-glucamine)

The illustrative amino ethers containing acidic groups have been set forth above in terms of the free acids or phenols. Normally it is advantageous to employ these compounds in the form of soluble salts; hence they may be employed in the forms wherein the hydrogens of the acid or phenolic groups are substituted by metals, e. g., sodium or potassium.

Any of the coupling components in use for coupling with diazo compounds may be employed with the diazoamino compounds of the present invention, for instance, the naphthols and naphtholates, 2,3-hydroxynaphthoic acid, 2,3-hydroxynaphthoic acid arylides, 2,6-hydroxynaphthoic acid arylides, alkyl-phenyl-pyrazolones, aceto-acetic acid arylides, 2-hydroxy-carbazole-ortho-carbonic arylides, and the 2,4-dihydroxyquinolines. Specific examples of these coupling components are given in connection with the following examples and in the table of dyestuff compositions which is a part hereof.

The following examples will serve to further illustrate the present invention (parts are by weight):

Example 1

Part A 142 parts 1-methyl-4-chlor-2-aminobenzene are stirred with 250 parts aqueous hydrochloric acid of 19° Bé. (about 30% HCl) and ice is added to keep the temperature between 0° and 5° C. 69 parts sodium nitrite (100% NaNO2) are dissolved in 200 parts water and this solution is added to the cooled amine hydrochloride. After diazotization is complete, the diazo solution is filtered and 429 parts of 1-methylaminobenzene-2,4-di-(oxyethyl-sodium sulfate) (amine #7) added, followed by an addition of sodium carbonate, while stirring, until the liquid reacts alkaline to Brilliant Yellow indicator paper. Coupling occurs gradually with progressive disappearance of the diazo body, and after two hours standing, a test made with a solution of R salt remains negative. Enough sodium chloride is then added to render the solution saturated, whereupon the light yellow diazoamino compound separates. It is filtered off, pressed, and dried, preferably in vacuum at 50° C.

The diazoamino compound has the following probable formula:

(51)

The 1-methylaminobenzene-2,4-di(oxy-ethyl-sulfate) is very conveniently prepared from methylamino-di(hydroxy-ethoxy) benzene by sulfation.

Part B

A dyestuff composition is made by mixing and grinding 582 parts of the diazoamino compound as obtained according to part A above with 300 parts of the sodium salt of 2,3-hydroxy-naphthoic acid-ortho-toluidide. A printing paste is then prepared by dissolving 60 parts of the dyestuff composition in 60 parts Cellosolve (monomethyl ether of ethylene glycol) and 330 parts hot water. The solution is thickened with 550 parts of a starch tragacanth thickener. Cotton material is printed with this paste by means of an engraved copper roll. The printed material is dried and the insoluble azo dye developed by a passage during 20 to 30 seconds in a hot solution (210° F.) of 5% Glauber salt, 5% acetic acid and 2% formic acid. The printed pattern is thus developed in a brilliant red dyeing due to formation of the red azo dye of the following probable constitution:

(52)

The fabric thereafter is rinsed, soaped, rinsed, and dried. Instead of the ortho-toluidide of 2,3-hydroxynaphthoic acid used in the above example, equivalent parts of di(aceto-acetyl) tolidide are used in order to produce a printing composition which, when applied under conditions as described above yields a yellow print due to formation, upon acidic aftertreatment of the textile fabric, of the yellow dyestuff of the following probable constitution:

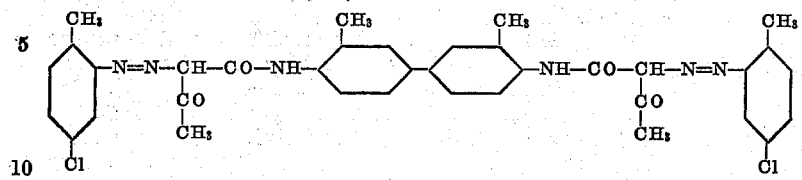

If in the above example the 429 parts of 1-methylamino-2,4-di(oxy-ethyl sodium sulfate) are replaced by a molecular equivalent of methyl-amino-benzyl-2-oxy-acetic acid, the following diazoimino compound is obtained:

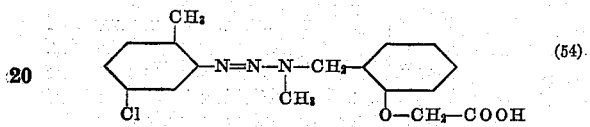

Example 2

Part A 127.5 parts of 3-chloro-1-aminobenzene are stirred with 250 parts hydrochloric acid 19° Bé. The crystal slurry is then cooled to 0° to 5° C., by the addition of ice and diazotized with a solution of 69 parts sodium nitrite (100%) in 300 parts of cold water. When diazotization is completed 289 parts of methylamino-benzyl-4-oxyethane sodium sulfonate (amine #10) are added while agitating, followed by sufficient sodium carbonate solution to render the liquor slightly alkaline. Coupling occurs very readily, whereupon sodium chloride is added, resulting in the precipitation of the corresponding diazoamino compound.

The product is filtered off, washed with a saturated sodium chloride solution, pressed free of the brine solution and dried at 60° C., in vacuum.

It is lightly colored, readily soluble in water, very stable towards alkaline hydrolysis, but regenerates the 3-chlor-1-aminobenzene diazonium chloride upon acid hydrolysis. Its probable formula is the following:

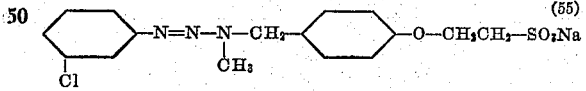

Part B

Equimolecular amounts of the above dry diazoamino compound and of the sodium salt of 2,3-hydroxynaphthoic acid anilide are intimately mixed and ground together. A dyestuff composition is thus obtained which is applied in a manner similar to that described in Example 1. The use of the composition may be described by the pad dyeing of cellulose for which it is very suitable.

80 parts of above dry mixture are dissolved in 80 parts alcohol followed by the addition of 300 parts hot water. The solution is then diluted to 1000 parts total weight with water at 40° C., containing 1 per cent of a 6 per cent gum tragacanth solution. The rayon fabric composed of regenerated cellulose is passed through this solution, which is at a temperature of approximately 45° C., in a padding machine so regulated as to leave 100 per cent of the dye liquor on the padded material, based on the weight of the fabric. Thereafter the fabric is very rapidly dried over hot cans and directly passed through a continuous steamer supplied with saturated steam containing ¼ per cent of its weight acetic acid and 1/10 per cent of its weight formic acid. The steaming device is conveniently arranged by letting the acid drip from various points of the steamer onto a steam heated acid-proof plate, whereby instantaneous vaporization and mixing with the main steam supply takes place.

Thus, a very brilliant plain shade of orange is obtained possessing excellent fastness properties, due to formation of the orange dyestuff of the probable formula:

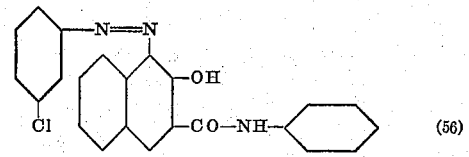

In the above example the methylamino-benzyl-4-oxy-ethane-sodium sulfonate may be replaced by an equimolecular amount of 1-methylamino-benzene-2,4-di(oxy sodium acetate) or by an equimolecular amount of 1-ethylamino benzene-4-oxy benzyl-2,5-disulfonic acid (with corresponding results).

Example 3

Part A 167 parts of 2,5-dichloro-1-aminobenzene are stirred with 500 parts hydrochloric acid 14° Bé. (approximately 20% strength) and after formation of the amine hydrochloride the crystal slurry is cooled to 5° C., with ice and diazotized with the addition of 60 parts sodium nitrite (100%) in 250 parts water. After diazotization is complete, the solution is filtered, whereupon 418 parts of 1-methylamino-4-(2',5'-disodium disulfonyl benzyloxy)benzene (amine #12) are added while stirring, followed by a slow and careful addition of caustic soda 20% solution until the reaction mixture is alkaline to Brilliant Yellow indicator paper. The solution is left for some time at a temperature of about plus 5° C. After a few hours the diazo reaction ceases to be positive (testing with R salt indicator paper), due to formation of the diazoimino compound of the following probable constitution:

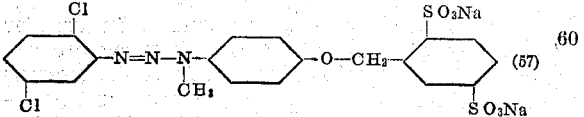

Part B

A solution of 330 parts of the sodium salt of 2,3-hydroxynaphthoic-ortho-phenetidide in 1000 parts diethylene glycol and 500 parts water are added to the mixture and the whole solution is then left standing overnight, filtered from possible precipitated inorganic salts and standardized so as to represent 5000 parts total of the dye intermediate solution. 100 to 400 parts of this solution are then thickened directly with 900 to 600 parts of a neutral starch tragacanth printing paste to proper consistency and applied in the usual manner on a cotton fabric by means of a printing roll. The printed fabric is then dried and subjected to the action of live steam containing acetic acid vapors, which cause the diazoimino compound to hydrolyze very readily into the active coupling 2,5-dichlorobenzene diazonium salt and causes formation on the fiber of a very brilliant scarlet azo dyestuff of the following probable constitution:

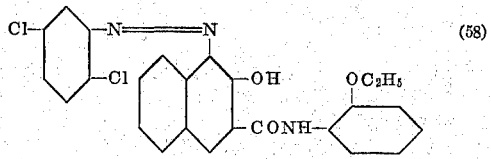

The printed material is aftertreated according to usual methods.

In a similar manner diazoamino compounds may be prepared from the other chlor and nitro substituted anilines aforementioned and the methylamino-benzene-4-oxy-benzyl-2',5'-disulfonic acid or alkali salts thereof. The products thus formed are white to yellowish to deeply orange colored powders, readily soluble in water. They are stable towards alkalies but are decomposed into the corresponding diazonium salts and the free stabilizer, methylamino-benzene-4-oxy-benzyl-2',5'-disodium disulfonate by the action of acid reagents thereon.

EXAMPLE 4

932 parts of a bis-diazoamino compound obtained from two molecular equivalents of 2-nitro-4-methyl-phenyl-diazonium chloride and about 1 molecular equivalent of 3,3'-di(ethylamino)-diphenylmethane-6,6'di(oxy disodium succinate) (amine #38) having the probable formula:

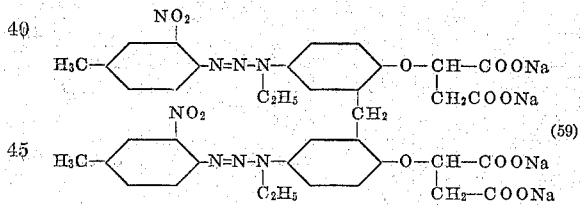

are dissolved in an aqueous solution comprising 2500 parts of water and about 100 parts of sodium acetate. To the resultant solution an aqueous alkaline solution comprising about 180 parts of aceto-acetanilide (100%), 2000 parts of water and 45 parts of NaOH is added. To this solution acetic acid is gradually added to accomplish neutralization, whereupon coupling proceeds progressively as more acetic acid is added. The rate of coupling may be accelerated by raising the temperature, say to 50° or 60° C. Upon completion of the reaction a yellow dyestuff of the probable formula:

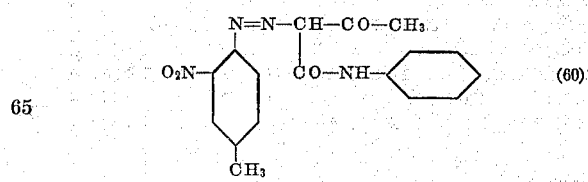

separates. This product may be filtered off, washed and dried in any suitable manner.

The above coupling reaction also may be accomplished on textile fibers when proceeding with the mixed solutions of the diazoimino compound and the coupling component according to the method illustrated in Example 2.

EXAMPLE 5

An aqueous solution of the diazoimino compound formed by coupling 2-nitro-4-methoxyphenyl-diazonium chloride and 1-methylamino-benzene-4-oxy-sodium acetate (amine #41) of the following formula:

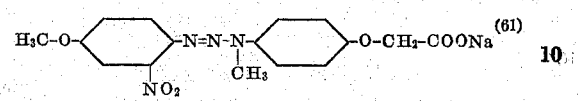

is treated with an alkaline aqueous aceto-acetyl-toluidide solution containing equimolecular quantities of the aceto-acetyl-toluidide, in the manner set forth in Example 4. An orange yellow azo dye of the probable formula:

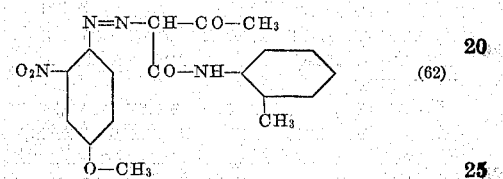

is thus obtained.

EXAMPLE 6

To 1000 parts by weight of an aqueous solution containing 6 parts by weight of the diazoimino compound obtained from 2-methyl-5-chlorphenyl diazonium chloride and 1-methyl-amino-benzene-4-oxy-phenyl-4'-oxy sodium acetate-5'-sodium sulfonate (amine #32), and having the probable formula:

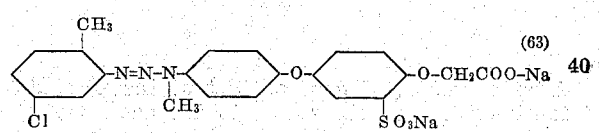

there are added 20 parts acetic acid, 5 parts of alum and 5 parts of sodium acetate.

Cotton fabric is impregnated in the customary manner with the sodium salt of 2-hydroxy-3-naphthoic acid-2'-naphthylamide; for instance, 50 grams of cotton may be impregnated with a liquor containing ½ to 5 grams of the amide, about 1 to about 10 ccs. of 34° Bé. (28%) NaOH, and about 1 to about 10 ccs. Turkey red oil of 50% strength.

The impregnated cotton is introduced into the bath containing the acidified diazoimino compound and the bath is slowly heated to about 50° to 60° C. The formation of the azo dyestuff on the fiber occurs very readily. It has the probable formula:

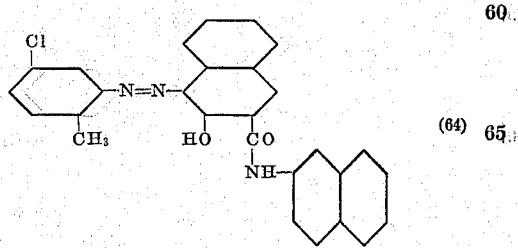

When the diazo compound can no longer be detected in the bath, the cotton is removed therefrom, is rinsed, soaped at boiling temperature, rinsed again, and dried. A brilliant red of excellent fastness is thus obtained.

Example 7

The sodium salt of the diazoimino compound obtainable from 2-methoxy-5-chlorphenyl-diazonium chloride and the sodium salt of 1-methylamino-3-chlorbenzene-6-oxy-phenyl-monosulfonic acid (amine #30), and having the probable formula:

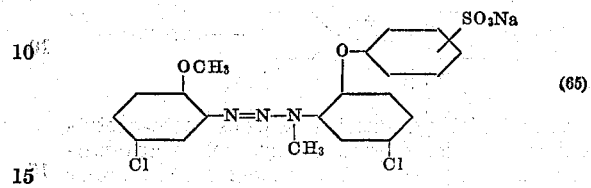
(65)

in slightly alkaline solution, is mixed in equimolecular ratio with 2-hydroxy-3-naphthoic acid-2'-anisidide in an aqueous solution containing equimolecular quantities of NaOH. The mixture is evaporated to dryness at low temperature in vacuum.

79 parts by weight of the dry product are made up to 1000 parts with 50 parts Turkey red oil, 50 parts urea, 600 parts tragacanth thickener, and the remainder water. The resultant printing paste may be printed on a textile fiber in usual manner. The printed fabric is passed through the acid vapor ager at a temperature of 100–102° C., the ager being supplied with steam containing between .05% and 1% acetic and .05% and ½% of formic acid vapors to form the azo dye having the probable formula:

(66)

After a short period of contact of the printed fabric with the acid vapors in the ager, say 2 minutes, the material is rinsed, soaped, rinsed and dried. A very brilliant scarlet print is thus obtained.

Example 8

A paste made in the same manner as in Example 7 but containing the diazoimino compound from 2,5-dichlorphenyl diazonium chloride and the sodium salt of 1-methylamino-3-chlorbenzene-6-oxy-phenyl-monosulfonic acid together with 2-hydroxy-3-naphthoic acid-2',5'-dimethoxy anilide as a coupling component instead of the diazoimino compound and coupling component of the previous example, yields a fast brown azo print on cotton, the azo compound having the probable formula:

(67)

Example 9

About 43 parts of the diazoimino compound from 3-chlor-phenyl diazonium chloride and p-methylamino-phenoxy-penta-hydroxy-hexane (amine #16)

(68)

and about 28 parts of 2-hydroxy-3-naphthoic acid-2-toluidide were made up to a paste with hot water with the addition of 60 parts of the monoethyl ether of glycol. To this paste, 30 parts by weight of 36° Bé. (30%) NaOH, 600 parts by weight of neutral starch tragacanth thickener were added, and the product is made up to 1000 parts by weight with water. This printing paste is applied to cotton fabric in the usual manner. The print is then steamed for around 5 minutes (or as an alternative is hung in contact with the atmosphere for about 21 hours). The cotton is then introduced for a short time into an aqueous bath, maintained at about 80° to 95° C., and containing 50 grams acetic acid and 50 grams sodium sulfate per liter. By this treatment the azo dye of the probable formula:

(69)

is developed on the fiber yielding a print of a very brilliant orange shade of excellent fastness. A similar result is obtained by developing the print in an acid bath containing formic, oxalic or another strong organic acid instead of the acetic acid mixture.

Likewise developments in a vapor ager containing a volatile acid such as acetic acid produce similar results.

Example 10

199 parts 4,4'-diamino diphenylamine are diazotized with 580 parts hydrochloric acid, 20° Bé. (about 31% HCl) and 140 parts of sodium nitrite in a total of 1500 parts of water, the solution being kept at a temperature of 0°–10° C., and 640 parts of 1-ethylamino-4-oxy-glyceryl sulfuric acid (amine #20) are slowly added thereto while stirring.

The reaction liquor is then rendered slightly alkaline with sodium carbonate. The solution ceases to couple after a while (this is detectable by a negative test with alkaline R salt solution). Upon adding sodium chloride to the solution a precipitate forms which is filtered off and dried in vacuum. The dried product has a pale brown color, is highly soluble in water, and has the following probable formula:

(70)

About 85 parts of the above bis-diazoimino compound and 55 parts of 2-hydroxy-3-naphthoic acid anilide were made up to a paste with 175 parts by weight of water and the addition of 100 parts of mono-ethyl ether of glycol. To this paste 50 parts by weight of 36° Bé. (30% NaOH), 500 parts by weight of neutral starch tragacanth thickener were added and the product made up to 1000 parts by weight with water. This printing paste was applied to the cotton fiber in the usual manner. Upon developing in the acid vapor ager a very deep black print was obtained, due to the formation of the dye of the following constitution:

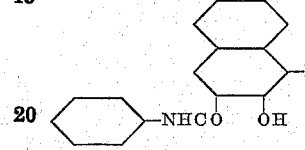 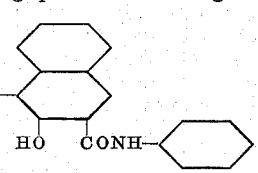 (71)

Thereafter the print was rinsed, soaped at boil, rinsed, and finished in the usual way.

It will be obvious from the above examples that the procedure involved in the preparation and use of these new diazoimino compounds or compositions is capable of almost limitless variations. Any of the usual methods of developing azo dyestuffs by coupling diazoimino compounds and coupling components may be employed with the diazoimino compounds of the present invention.

The following table further illustrates the nature of compositions of dyes that may be obtained by the application of my invention. In this table are shown the shades of dyeings obtainable with the diazoimino compounds and the coupling components set forth. It will be understood that such dyeings may be obtained by substantive preparation, or by printing textile fibers with a printing paste containing the diazoimino compound and the coupling component and subsequently developing, or by impregnating the textile fiber with one of the components and subsequently developing the dye by bringing the impregnated fiber into contact with the other component under conditions favoring azo coupling.

| No. | Base | No. | Stabilizer | Coupling component | Shade |
|---|---|---|---|---|---|
| 1 | 2,5-dichlor-1-aminobenzene | 4 | 1-methyl-3-amino-benzene-4-oxy-ethyl-sulfonic acid. | Diacetoacetyl-o-tolidide | Yellow. |
| 2 | do | 11 | 1-methylamino-benzene-2,4-di(oxy-acetic acid). | 2,5-dichlor-4-nitro-1-aceto-acetyl amino-benzene. | Do. |
| 3 | 4-chloro-2-amino-1-methyl-benzene | 18 | 1-ethylamino-methylbenzene-2,4-di-(oxy-ethyl-sulfonic acid). | Diacetoacetyl-o-tolidide | Do. |
| 4 | 4,5-dichlor-2-amino-1-methylbenzene. | 29 | 1-ethylamino-3-chlorbenzene-6-oxy-malonic acid. | do | Do. |
| 5 | 4-chloro-2-amino-1-methoxy-benzene. | 36 | 1,4-di-(paramethylamino-benzyl-oxy)-benzene-disulfonic acid. | do | Do. |
| 6 | 2,5-dichloro-1-methyl-4-amino-benzene. | 26 | 1-methylamino-naphthalene-4-oxy-acetic acid. | do | Do. |
| 7 | 5-nitro-2-amino-1-methylbenzene | 15 | 1-methylaminobenzene-2,4-di-(oxy-ethyl-sulfonic acid). | Sodium compound of 4-nitro-2,5-dimethoxy-1-aceto-acetanilide. | Do. |
| 8 | 3-chloro-1-aminobenzene | 32 | 1-methylaminobenzene-4-oxy-phenyl-4'-oxy-acetic-5'-sulfonic acid. | 2-hydroxy-naphthalene-3-carboxylic-o-toluidide. | Orange. |
| 9 | do | 7 | 1-methylaminobenzene-2,4-di-(oxy-ethyl-sulfuric acid). | Sodium compound of 2-hydroxy-naphthalene-3-carboxylic-o-toluidide. | Do. Do. |
| 10 | 2,5-dichloro-1-aminobenzene | 20 | Ethylaminobenzene-para-oxy-(2-hydroxy)propyl-sulfuric acid. | 2-hydroxy-naphthalene-3-carboxylic-acid-o-phenetidide. | Do. |
| 11 | do | 5 | 1-methyl-3-methylaminobenzene-4-oxy-ethyl-sulfuric acid. | Sodium compound of 2-hydroxy-naphthalene-3-carboxylic acid-o-phenetidide. | Do. |
| 12 | 4-chlor-2-amino-1-methyl-benzene | 23 | 1-methylamino-naphthalene-2-oxy-ethyl-sulfonic acid. | 2-hydroxy-naphthalene-3-carboxylic acid-o-phenetidide | Scarlet. |
| 13 | 2-amino-4-methoxy-5-benzoylamino-1-chlorobenzene. | 38 | 3-3'-di(ethylamino)-diphenyl-methane-6,6'-di(oxy-succinic acid). | 2-hydroxy-naphthalene-3-carboxylic acid-o-toluidide. | Violet. |
| 14 | 2,5-dichloro-1-aminobenzene | 13 | 1-ethylaminobenzene-4-oxy-methyl-benzene-2',5'-disulfonic acid. | 2-hydroxy-naphthalene-3-carboxylic acid-o-anisidide. | Scarlet. |
| 15 | do | 35 | Di-(methylamino-phenoxy)-succinic acid. | Sodium compound of 2-hydroxy-naphthalene-3-carboxylic acid-o-anisidide. | Do. |
| 16 | 3-chloro-1-aminobenzene | 30 | 1-methylamino-3-chlorbenzene-6-oxy-phenyl-mono-sulfonic acid. | 2-hydroxy-naphthalene-3-carboxylic acid-o-anisidide. | Red. |
| 17 | 4,6-dichloro-2-amino-1-methylbenzene. | 19 | 1-cyclohexyl-aminobenzene-2,4-di-(oxy-methylbenzene-2,5'-di-sulfonic acid). | 2-hydroxy-naphthalene-3-carboxylic acid p-anisidide. | Do. |
| 18 | do | 25 | 1-methylamino-naphthalene-2-oxy-succinic acid. | Sodium compound of 2-hydroxy-naphthalene-3-carboxylic acid-o-anisidide. | Do. |
| 19 | 4-chloro-2-amino-1-methyl-benzene | 33 | 1-methylamino-methyl-3-chlor-benzene-4-oxy-succinic acid. | do | Do. |
| 20 | 4-chloro-2-amino-1-methoxy-benzene. | 6 | 1-amino-4-hydroxyethoxy-benzene-2-oxy-ethyl-sulfuric acid. | do | Do. |
| 21 | 4-chloro-2-amino-1-methyl-benzene | 17 | 1-ethylaminomethylbenzene-2,4-di-(oxy-acetic acid). | 2-hydroxy-naphthalene-3-carboxylic-acid-o-toluidide. | Do. |
| 22 | do | 8 | 1-methylamino-benzene-4-glyceryl-phosphoric acid. | Sodium compound of 2-hydroxy-naphthalene-3-carboxylic acid anilide. | Do |
| 23 | 4-amino-1,3-dimethylbenzene | 21 | 1-methylamino-3-chlorbenzene-6-oxy-acetic acid. | 2-hydroxy-naphthalene-3-carboxylic acid-2'-methyl-4'-methoxy anilide. | Turkey red. |
| 24 | 4-nitro-2-amino-1-methoxybenzene | 10 | 1-methylamino-methylbenzene-4'-oxy-ethyl-sulfonic acid. | Sodium salt of 2-hydroxy-naphthalene-3-carboxylic acid-m-nitro-anilide. | Bluish red. |
| 25 | 4,5-dichloro-2-amino-1-methylbenzene. | 16 | 1-methylamino-benzene-4-oxy-pentahydroxy-hexane. | Sodium compound of 2-hydroxy-naphthalene-3-carboxylic acid-m-nitro-anilide. | Turkey red. |
| 26 | do | 40 | 3,3'-di(ethylamino)-6,6'-di(2,5 disulfobenzyloxy)-diphenyl-methane. | 2-hydroxy-naphthalene-3-carboxylic acid-p-anisidide. | Do. |
| 27 | 5-nitro-2-amino-1-methylbenzene | 34 | 1-methlamino-benzene-4-beta-oxy-naphthalene-sulfonic acid. | Sodium compound of 2-hydroxy-naphthalene-3-carboxylic acid-o-toluidide. | Bordeaux. |
| 28 | do | 33 | 1-methylamino-methyl-3-chlor-benzene-4-oxy-succinic acid. | 2-hydroxy-naphthalene-3-carboxylic acid-o-toluidide. | Do. |

| No. | Base | No. | Stabilizer | Coupling component | Shade |
|---|---|---|---|---|---|
| 29 | 5-nitro-2-amino-1-methoxybenzene | 22 | 1-methylamino-3-chlorbenzene-6-oxy-succinic acid. | Sodium compound of 2-hydroxy-naphthalene-3-carboxylic acid alpha-naphthyl-amide. | Do. |
| 30 | 3-amino-4-methoxy-6-nitro-1-methylbenzene. | 12 | 1-methylamino-benzene-4-oxy-methylbenzene-2',5'-disulfonic acid. | 2-hydroxy-naphthalene-3-carboxylic acid-alpha-naphthylamide. | Do. |
| 31 | ___do___ | 9 | 1-methylamino-methylbenzene-2-oxy-acetic acid. | Sodium compound of 2-hydroxy-naphthalene-3-carboxylic acid-alpha-naphthyl-amide. | Do. |
| 32 | ___do___ | 14 | 1-aminobenzene-4-oxy-ethyl-sulfonic acid. | 2-hydroxy-naphthalene-3-carboxylic acid-beta-naphthyl-amide. | Do. |
| 33 | ___do___ | 24 | 1-methylamino-naphthalene-2-oxy acetic acid. | 2-hydroxy-naphthalene-3-carboxylic acid-2',5'-di-methoxy-anilide. | Do. |
| 34 | 5-nitro-2-amino-1-methoxybenzene | 31 | 1-ethylamino-3-chlorbenzene-6-oxy-phenyl-di-sulfonic acid. | Sodium compound of 2-hydroxy-3-carboxylic acid-alphanaphthylamide. | Do. |
| 35 | 3-amino-4-methoxy-6-benzoyl-amino-1-methylbenzene. | 21 | 1-methylamino-3-chlorbenzene-6-oxy-acetic acid. | Sodium compound of 2,3-hydroxy-naphthanilide. | Violet. |
| 36 | ___do___ | 28 | 1-ethylamino-naphthalene-4-oxy-succinic acid. | Sodium compound of 2-hydroxy-naphthalene-3-carboxylic acid-o-toluidide. | Do. |
| 37 | ___do___ | 27 | 1-methylamino-naphthalene-4-oxy-ethyl-sulfonic acid. | 2-hydroxy-naphthalene-3-carboxylic acid-o-toluidide. | Do. |
| 38 | 6-amino-4-benzoylamino-1,3-dimethoxybenzene. | 39 | 3,3'-di(ethylamino)-6,6-di(sulfonyl-phenoxy)-diphenyl-methane. | Sodium compound of 2,3-hydroxy-naphthanilide. | Do. |
| 39 | ___do___ | 35 | Di-(methylamino-phenoxy)-succinic acid. | 2-hydroxy-naphthalene-3-carboxylic acid-o-toluidide. | Do. |
| 40 | ___do___ | 9 | 1-methylamino-methylbenzene-2-oxy-acetic acid. | Sodium compound of 2-hydroxy-naphthalene-3-carboxylic acid-5'-chlor-2'-toluidide. | Do. |
| 41 | 4,4'-diamino-3,3'-dimethoxy-azobenzene. | 37 | 3,3'-di(methylamino)-diphenyl-methane-6,6'-di(oxy-acetic acid). | 2-hydroxy-naphthalene-3-carboxylic acid-o-toluidide. | Blue. |
| 42 | 6-amino-3-benzoylamino 1,4-diethoxybenzene. | 6 | 1-amino-4-hydroxy-methoxybenzene-2-oxy-ethyl-sulfuric acid. | Sodium compound of 2-hydroxy-naphthalene-3-carboxylic acid-o-toluidide. | Do. |
| 43 | ___do___ | 21 | 1-methylamino-3-chlorbenzene-6-oxy-acetic acid. | 2,3-hydroxy-naphthanilide. | Do. |
| 44 | 6-amino-3-benzoylamino-4-ethoxy-1-methoxybenzene. | 13 | 1-ethylamino-benzene-4-oxy-methyl-benzene-2',5'-disulfonic acid. | Sodium compound of 2-hydroxy-naphthalene-3-carboxylic acid-ortho-toluidide. | Do. |
| 45 | ___do___ | 22 | 1-methylamino-3-chlorbenzene-6-oxy-succinic acid. | Sodium salt of 2,3-hydroxy-naphthanilide. | Do. |
| 46 | 6-amino-3-benzoylamino-1,4-dimethoxy-benzene. | 10 | 1-methylamino-methylbenzene-4-oxy-ethyl-sulfonic acid. | Sodium compound of 2-hydroxy-naphthalene-3-carboxylic acid-ortho-toluidide. | Do. |
| 47 | ___do___ | 9 | 1-methylamino-methylbenzene-2-oxy-acetic acid. | ___do___ | Do. |
| 48 | 4-chlor-2-amino-1-methyl-benzene | 14 | 1-aminobenzene-4-oxy-ethyl-sulfonic acid. | Sodium compound of 2-hydroxy-carbazole-ortho-carboxylic acid-2-toluidide. | Brown. |
| 49 | 4-nitro-4'-amino-2',5'-dimethoxy-azobenzene. | 24 | 1-methylamino-naphthalene-2-oxy-acetic acid. | Sodium compound of 2-hydroxy-naphthalene-3-carboxylic acid-ortho-toluidide. | Black. |
| 50 | 3-nitro-4'-amino-2',5'-dimethoxy-azobenzene. | 37 | 3,3'-di(methylamino)-diphenyl-methane-6,6'-di(oxy-acetic acid). | Sodium compound of 2-hydroxy-naphthalene-3-carboxylic acid-alpha-naphthylamide. | Do. |
| 51 | 4-methyl-4'-amino-2-methoxy-5-methylazo-benzene. | 29 | 1-ethylamino-3-chlorbenzene-6-oxy-malonic acid. | Sodium compound of 2-hydroxy-naphthalene-3-carboxylic acid-ortho-toluidide. | Do. |
| 52 | 4-chlor-4'-amino-2',5'-diethoxy-azobenzene. | 33 | 1-methylamino-methyl-3-chlor-benzene-4-oxy succinic acid. | Sodium compound of 2-hydroxy-naphthalene-3-carboxylic acid-alpha-naphthylamide. | Do. |
| 53 | 4-nitro-2-amino-1-methoxy-benzene | 42 | 1-methyl-3-methylamino-benzene-4-oxyethyl-sulfuric acid. | Sodium compound of 2-hydroxy-naphthalene-3-carboxylic acid-m-nitro-anilide. | Bluish red. |
| 54 | 5-nitro-2-amino-toluene | 43 | 2-ethylamino-4-chlorphenoxy-butyl-sulfuric acid. | 2,3-hydroxy-naphthoic-ortho-toluidide. | Bordeaux. |
| 55 | ___do___ | 43 | 2-ethylamino-4-chlorphenoxy-butyl-sulfuric acid. | Sodium compound of 2,3-hydroxy-naphthoic-ortho-toluidide. | Do. |

I claim:

1. As a new compound an aromatic diazoamino ether comprising on one side of the diazoamino group an aromatic group joined directly to the diazo group, which aromatic group is capable of forming with an azo coupling component an insoluble azo compound, and on the other side a solubilizing group separated from the diazoamino group by an ether oxygen atom.

2. As a new compound an aromatic diazoamino ether comprising on one side of the diazoamino group an aromatic group joined directly to the diazo group, which aromatic group is capable of forming with an azo coupling component an insoluble azo compound, and on the other side a water-solubilizing partial ester group separated from the diazoamino group by an ether oxygen atom.

3. As a new compound an aromatic bis-diazoamino ether comprising on the one side of each of the two diazoamino groups an aromatic group joined directly to the diazo group, which aromatic group is capable of forming with an azo coupling component an insoluble azo compound, and on the other side a solubilizing group separated from the diazoamino groups by an ether oxygen atom.

4. As a new compound a symmetrical aromatic bis-diazoamino ether comprising a pair of twin aromatic diazoamino ether radicals comprising on the one side of the diazoamino group an aromatic group joined directly to the diazo group, which aromatic group is capable of forming with an azo coupling component an insoluble azo compound, and on the other side a solubilizing group separated from the diazoamino group by an ether oxygen atom, said radicals being joined to one another by a carbon-to-carbon linkage to form a symmetrical molecule.

5. The method of producing an aromatic diazoamino ether of the type set forth in claim 1, which comprises coupling the diazonium salt of an insoluble aromatic amine with an amino ether having a solubilizing group separated from the amino group by an ether oxygen atom.

6. The method of producing an aromatic diazoamino ether of the type set forth in claim 2, which comprises coupling the diazonium salt of an insoluble aromatic amine with an amino ether having a water-solubilizing partial ester group separated from the amino group by an ether oxygen atom.

7. The method of producing an aromatic bis-diazoamino ether of the type set forth in claim 3, which comprises coupling two mols of the diazonium salt of an insoluble aromatic amine with one mol of a diamino ether having a solubilizing group separated from the amino group by an ether oxygen atom.

8. The method of producing a symmetrical aromatic bis-diazoamino ether of the type set forth in claim 4, which comprises coupling two mols of the diazonium salt of an insoluble aromatic amine with one mol of a diamino ether comprising a pair of twin amino ether radicals containing a solubilizing group separated from the amino group by an ether oxygen atom, said radicals being joined to one another by a carbon-to-carbon linkage to form a symmetrical molecule.

JEAN G. KERN.

CERTIFICATE OF CORRECTION.

Patent No. 2,190,841.　　　　　　　　　　　　　　　February 20, 1940.

JEAN G. KERN.

It is hereby certified that error appears in the printed specification of the above numbered patent requiring correction as follows: Page 3, first column, line 56, formulae 5, for "aicd" read acid; page 4, first column, line 43, formulae 27, for "9-methylamino" read 1-methylamino; page 8, second column, line 14, for "acid-2-toluidide" read acid-2'-toluidide; page 9, line 55-56, in the table, second column thereof, for "(oxy-methylbenzene-2,5'-di-sulfonic acid)" read (oxy-methylbenzene-2',5'-di-sulfonic acid); line 72, same column of same table, for "1-methlamino" read 1-methylamino; page 10, line 19, in the table, second column thereof, for "-6,6-" read -6,6'-; page 11, first column, line 5, claim 7, for "group" read groups; and that the said Letters Patent should be read with this correction therein that the same may conform to the record of the case in the Patent Office.

Signed and sealed this 16th day of April, A. D. 1940.

(Seal)　　　　　　　　　　　　　　　　　　　　　　Leslie Frazer
　　　　　　　　　　　　　　　　　　　　　Acting Commissioner of Patents.